(12) United States Patent
Shikowitz et al.

(10) Patent No.: US 9,413,689 B1
(45) Date of Patent: Aug. 9, 2016

(54) MOBILE INTELLIGENT TRACKING AND COMMUNICATION HUB

(71) Applicant: On Track Technologies, Inc., Durham, NC (US)

(72) Inventors: Penny Shikowitz, Durham, NC (US); Glenwood Garner, III, Fort Collins, CO (US)

(73) Assignee: On Track Technologies Inc., Durham, NC (US)

( * ) Notice: Subject to any disclaimer, the term of this patent is extended or adjusted under 35 U.S.C. 154(b) by 0 days.

(21) Appl. No.: 13/674,282

(22) Filed: Nov. 12, 2012

Related U.S. Application Data

(60) Provisional application No. 61/558,614, filed on Nov. 11, 2011.

(51) Int. Cl.
*H04L 12/931* (2013.01)

(52) U.S. Cl.
CPC ...................................... *H04L 49/00* (2013.01)

(58) Field of Classification Search
CPC ........ H04W 4/18; G06K 19/077; H04L 49/00
See application file for complete search history.

(56) References Cited

U.S. PATENT DOCUMENTS

| | | |
|---|---|---|
| 6,269,252 B1 | 7/2001 | Hutchings et al. |
| 6,272,120 B1 | 8/2001 | Alexander |
| 6,452,910 B1 | 9/2002 | Vij et al. |
| 6,519,530 B2 | 2/2003 | Crockett et al. |
| 6,539,020 B1 | 3/2003 | Barber et al. |
| 6,708,247 B1 | 3/2004 | Barret et al. |
| 6,937,615 B1 | 8/2005 | Lazzarotto et al. |
| 7,295,530 B2 | 11/2007 | Chu et al. |
| 7,310,697 B2 | 12/2007 | Pandit et al. |
| 7,376,091 B1 | 5/2008 | Eccles et al. |
| 7,486,633 B2 | 2/2009 | Tamura |
| 7,751,350 B1 | 7/2010 | Pabst |
| 7,894,474 B1 | 2/2011 | Bell |
| 7,912,503 B2 | 3/2011 | Chang et al. |
| 8,059,574 B2 | 11/2011 | Roy et al. |
| 8,126,442 B2 | 2/2012 | Wolfe |
| 8,155,008 B2 | 4/2012 | Jetcheva et al. |
| 2005/0090201 A1 | 4/2005 | Lengies et al. |
| 2005/0248456 A1 | 11/2005 | Britton et al. |
| 2006/0132302 A1* | 6/2006 | Stilp ........................ G05B 9/03 340/539.22 |
| 2006/0268807 A1 | 11/2006 | Meier |
| 2007/0115859 A1 | 5/2007 | Meyers |

(Continued)

FOREIGN PATENT DOCUMENTS

| | | |
|---|---|---|
| WO | 2011/106200 A1 | 9/2011 |
| WO | 2011/159403 A1 | 12/2011 |
| WO | 2012/018945 A1 | 2/2012 |

*Primary Examiner* — Jianye Wu
(74) *Attorney, Agent, or Firm* — Meunier Carlin & Curfman LLC

(57) ABSTRACT

A mobile intelligent tracking and communication hub (MITCH) includes a communication module, a sensor module, and a processor. The processor is communicatively coupled to the communication module and to the sensor module. The processor is typically configured for (i) receiving a data packet in the first protocol from a first device, (ii) manipulating the data packet in response to situational status information received by the sensor module, (iii) translating the data packet from the first protocol to the second protocol, and (iv) transmitting the data packet with the communication module to a second device, the second device being configured to receive data in the second protocol.

18 Claims, 10 Drawing Sheets

(56) References Cited

U.S. PATENT DOCUMENTS

| | | |
|---|---|---|
| 2009/0046655 A1 | 2/2009 | Zhao et al. |
| 2009/0204725 A1* | 8/2009 | Liu ......................... H04W 4/18 709/246 |
| 2009/0238087 A1 | 9/2009 | Shikowitz et al. |
| 2011/0022254 A1 | 1/2011 | Teener et al. |
| 2011/0046920 A1 | 2/2011 | Amis |
| 2012/0295601 A1* | 11/2012 | Lang ...................... G06Q 10/10 455/415 |

\* cited by examiner

MOBILE INTELLIGENT TRACKING AND COMMUNICATION HUB

CROSS-REFERENCE TO PRIORITY APPLICATION

This U.S. nonprovisional application claims the benefit of U.S. Patent Application Ser. No. 61/558,614 for an Intelligent Heterogeneous, Mobile, Ad-Hoc Communication Network (filed Nov. 11, 2011), which is hereby incorporated by reference in its entirety.

FIELD OF THE INVENTION

The present invention relates to a mobile intelligent tracking and communication hub that facilitates communication between devices employing different communication protocols.

BACKGROUND

Mobile ad-hoc networks permit geographically dispersed communication devices to form a network in which one device in the network typically sends data to another device in the network through other devices in the network. Mobile ad-hoc networks are finding use in a variety of applications, such as (i) disaster recovery/monitoring in areas where the pre-existing communication infrastructure may have been destroyed, eliminating the need for wires in personal area networks, and maintaining non-line-of-sight communication in remote areas.

As mobile communication devices become more powerful and common, there is a need for a mobile ad-hoc network that possesses a high degree of intelligence to efficiently monitor the status of the network and a great number of mobile communication devices that differ along a wide variety of dimensions that are either inherent to the device or reflect the environment within which the device is located. Accordingly, a need exists for an improved communication hub that can be used within a mobile ad-hoc network.

SUMMARY

Accordingly, in one aspect, the present invention embraces a mobile communication hub that includes (i) a communication module configured to receive and transmit data in both a first protocol and a second protocol, (ii) a sensor for measuring situational status information, and (iii) a processor communicatively coupled to the communication module and to the sensor module. The processor is configured for (i) receiving with the communication module a data packet in the first protocol from a first device, (ii) manipulating the data packet in response to situational status information received by the sensor module, (iii) translating the data packet from the first protocol to the second protocol, and (iv) transmitting the data packet with the communication module to a second device, the second device being configured to receive data in the second protocol.

In another aspect, the present invention embraces a mobile communication hub that includes a communication module and a processor communicatively coupled to the communication module. The communication module is configured to receive and transmit data in both a first protocol and a second protocol. The communication module is also configured to communicate with a communication network. The processor is configured for (i) receiving with the communication module a data packet in the first protocol from a first device, (ii) receiving with the communication module a command from the communication network, (iii) manipulating the data packet in response to the command from the communication network, (iv) translating the data packet from the first protocol to the second protocol, and (v) transmitting the data packet with the communication module to a second device, the second device being configured to receive data in the second protocol.

In yet another aspect, the present invention embraces a mobile communication hub that includes a communication module and a processor communicatively coupled to the communication module. The communication module is configured to receive and transmit data in both a first protocol and a second protocol. The communication module is also configured to communicate with a communication network. The processor is configured for (i) receiving with the communication module a data packet in the first protocol from a first device, (ii) receiving with the communication module situational status information from the communication network (e.g., from any device in the communication network), (iii) manipulating the data packet in response to the situational status information from the device in the communication network, (iv) translating the data packet from the first protocol to the second protocol, and (v) transmitting the data packet with the communication module to a second device, the second device being configured to receive data in the second protocol.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention embraces a mobile intelligent tracking and communication hub (MITCH) that facilitates communication between devices employing different communication protocols.

Figure 1:
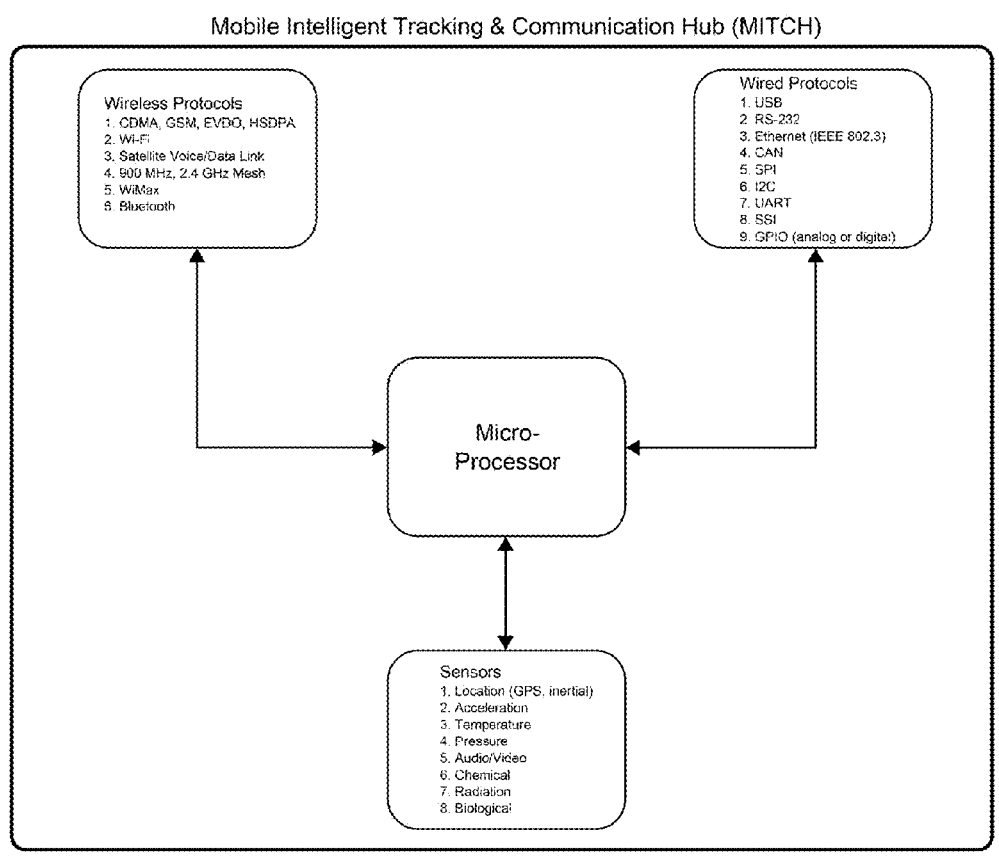
FIG. 1 schematically depicts a mobile intelligent tracking and communication hub in accordance with the present invention.
Figure 2:
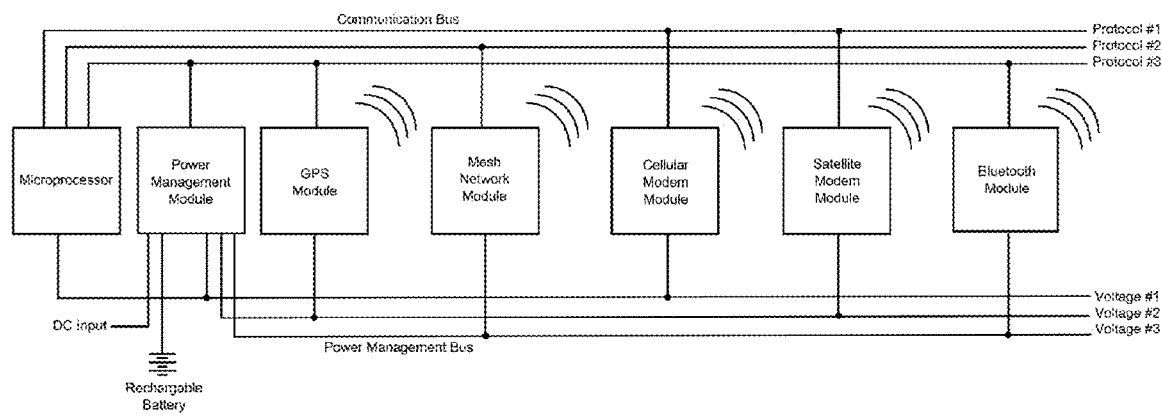
FIG. 2 further schematically depicts a mobile intelligent tracking and communication hub.
Figure 3:
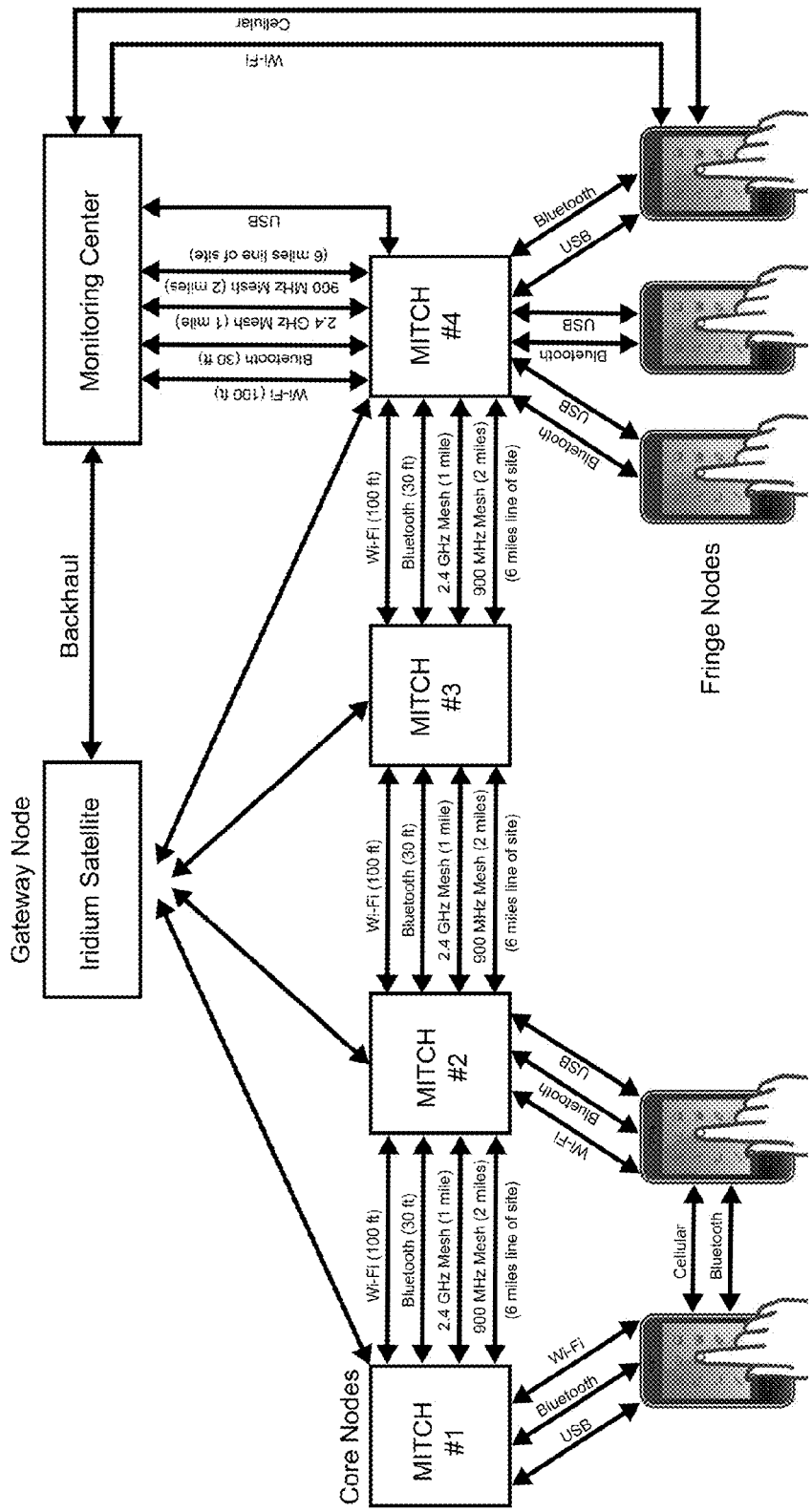
FIG. 3 depicts a mobile intelligent tracking and communication hub being employed within a mobile ad-hoc network in accordance with an embodiment of the present invention.

As depicted in FIGS. 1-2, a mobile intelligent tracking and communication hub (i.e., a MITCH device) typically includes a communication module, a sensor module, and a processor (e.g., a microprocessor). The processor is communicatively coupled to the communication module and to the sensor module. The MITCH device may include a communication bus for the communication module, the sensor module, and the processor. Other embodiments of system bus architecture providing for efficient data transfer and/or communication between the components of the MITCH device may also be employed in exemplary embodiments in accordance with the present invention. As depicted in FIG. 2, the MITCH device may include a power supply (e.g., a rechargeable battery) and a power management module.

Typically, the processor is configured to execute instructions and to carry out operations associated with the MITCH device. For example, using instructions retrieved from a memory (e.g., a memory block), the processor may control the reception and manipulation of input and output data between components of the MITCH device. The processor typically operates with an operating system to execute computer code and produce and use data. The operating system, other computer code, and data may reside within the memory that is operatively coupled to the processor. The memory generally provides a place to store computer code and data that are used by the MITCH device. The memory may include Read-Only Memory (ROM), Random-Access Memory (RAM), a hard disk drive, and/or other non-transitory storage media. The operating system, other computer code, and data may also reside on a removable non-transitory storage medium that is loaded or installed onto the MITCH device when needed.

The communication module includes hardware that enables the MITCH device to receive and transmit information over various wireless and/or wired communication protocols. Exemplary wireless protocols that can be employed by the communication module include, but are not limited to, CDMA, GSM, EVDO, HSDPA, Wi-Fi, satellite voice/data link, 900 MHz RF, 2.4 GHz RF, WiMax, and/or Bluetooth. Exemplary wired protocols that can be employed by the communication module include, but are not limited to, USB, RS-232, Ethernet (IEEE 802.3), CAN, SPI, I2C, UART, SSI, and/or GPIO. As depicted in FIG. 2, to facilitate communication over various communication protocols, the communication module may include a mesh-network module, a cellular-modem module, a satellite module, and/or a Bluetooth module.

The sensor module enables the MITCH device to measure situational status information. To measure situational status information, the sensor module receives situational status information from a location sensor (e.g., a GPS module), an acceleration sensor, an audio sensor (e.g., a microphone), a visual sensor, a temperature sensor, a pressure sensor, a chemical sensor, a radiation sensor, and/or a biological sensor. As used herein, situational status information includes information about the environment in which the MITCH device is located. Situational status information includes, but is not limited to, temperature, location, speed, acceleration, and the presence or absence of certain chemicals, gases, solids, or liquids.

As noted, the MITCH device is capable of sending and receiving information from devices using various protocols. As such, the MITCH device can function as a communication bridge between two devices employing different communication protocols (i.e., two devices that cannot directly communicate with one another).

Figure 7A:
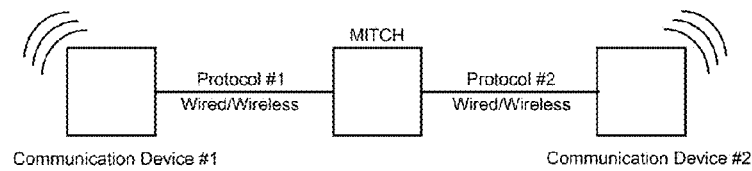
FIGS. 7A-7B depict a mobile intelligent tracking and communication hub being in communication with various devices.

Accordingly, the processor is configured for receiving a data packet in a first communication protocol from a first device. In order to communicate with a second device that is configured to receive data in a second communication protocol, the processor is configured to translate the data packet from the first communication protocol to the second communication protocol. Typically, to translate a data packet in the first protocol to the second protocol, data is extracted from the packet and thereafter inserted into a newly created packet in the second communication protocol. Once the data packet has been translated to the second communication protocol, the data packet can be transmitted to the second device. FIG. 7A depicts a MITCH device being used as a communication bridge between a first communication device using a first protocol and a second communication device using a second protocol.

In one embodiment, translating the data packet from the first protocol to the second protocol may involve the intermediate steps of translating the data packet from the first protocol to an intermediate protocol and thereafter translating the data packet from the intermediate protocol to the second protocol.

In a typical embodiment, the processor is further configured for manipulating the data packet (i.e., before transmitting the data packet to the second device) in response to situational status information (e.g., in response to information from the sensor module reaching a certain threshold). Although this situational status information is typically received from the sensor module, it is within the scope of the present invention for this situational status information to be received by the MITCH device from another device (e.g., a mobile device or a monitoring center) in a communication network to which the MITCH device is connected. In another embodiment, the processor is further configured for manipulating the data packet in response to a command from a communication network to which the MITCH device is connected, such as from a device (e.g., a mobile device or a monitoring center) in the communication network. The manipulation of the data packet may occur (i) when the data packet is in the first protocol, (ii) when the data packet is in the second protocol, or (iii) when the data packet is in the intermediate protocol.

Manipulating the data packet may include adding data to the data packet, deleting data from the data packet, and/or formatting data in the data packet. By way of example, the MITCH device may (i) add situational status information to the data packet, (ii) remove unnecessary data in the data packet, (iii) sort data in the data packet (e.g., in numeric or alphabetic order), (iv) combine data from multiple data packets into one data packet, and/or (v) analyze data in the data packet and add this analysis to the data packet. The manipulation of the data packet by the MITCH device may be altered in response to a command received from the communication network.

Figure 4:
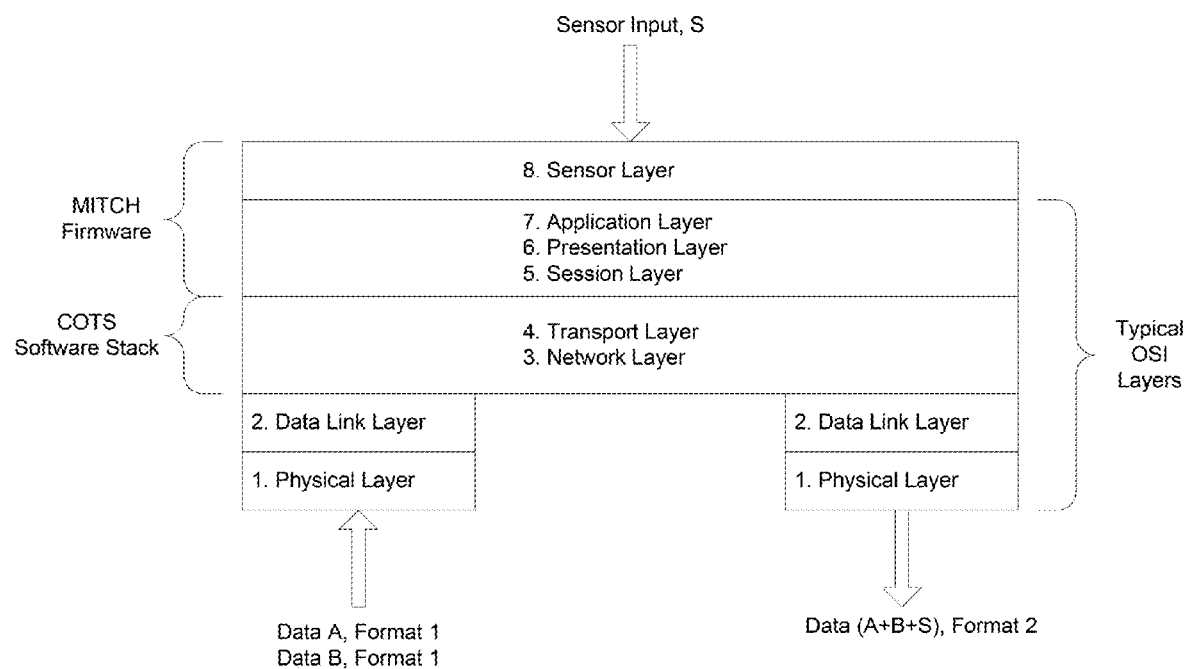
FIG. 4 depicts an OSI model showing the typical operation of a mobile intelligent tracking and communication hub in accordance with the present invention.
Figure 5:
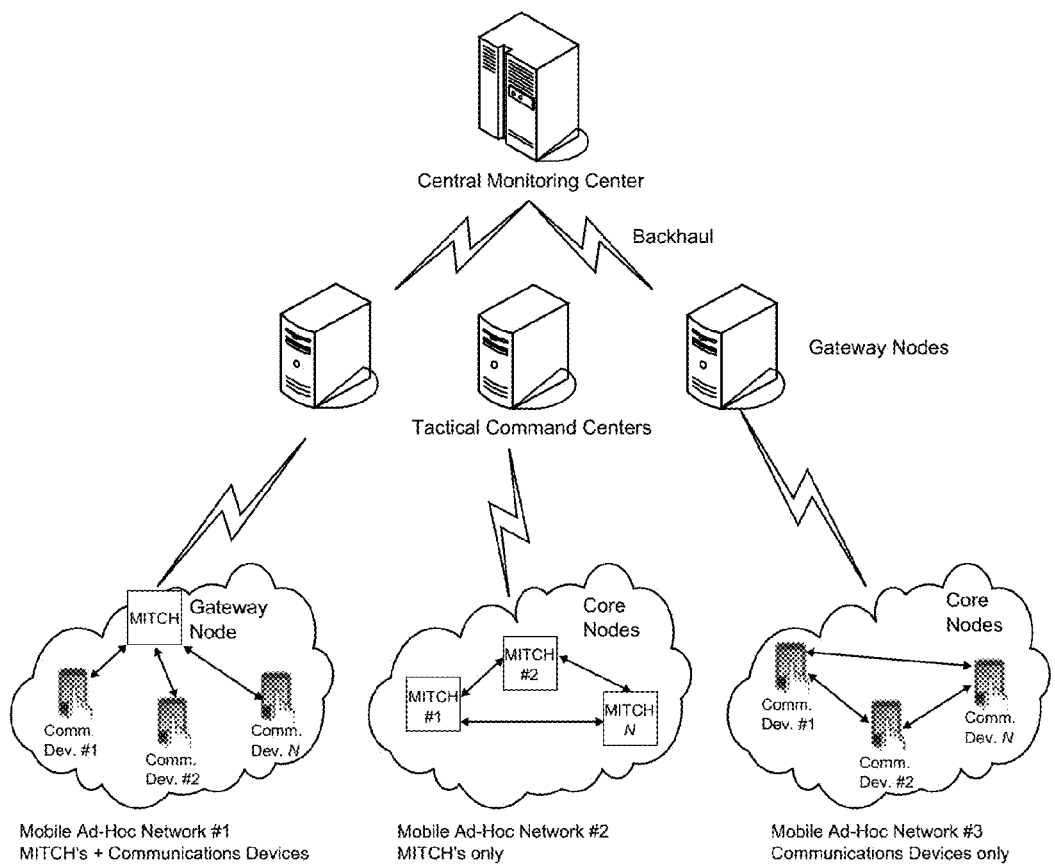
FIG. 5 depicts a mobile intelligent tracking and communication hub being employed within a mobile ad-hoc network in accordance with another embodiment of the present invention.
Figure 6A:
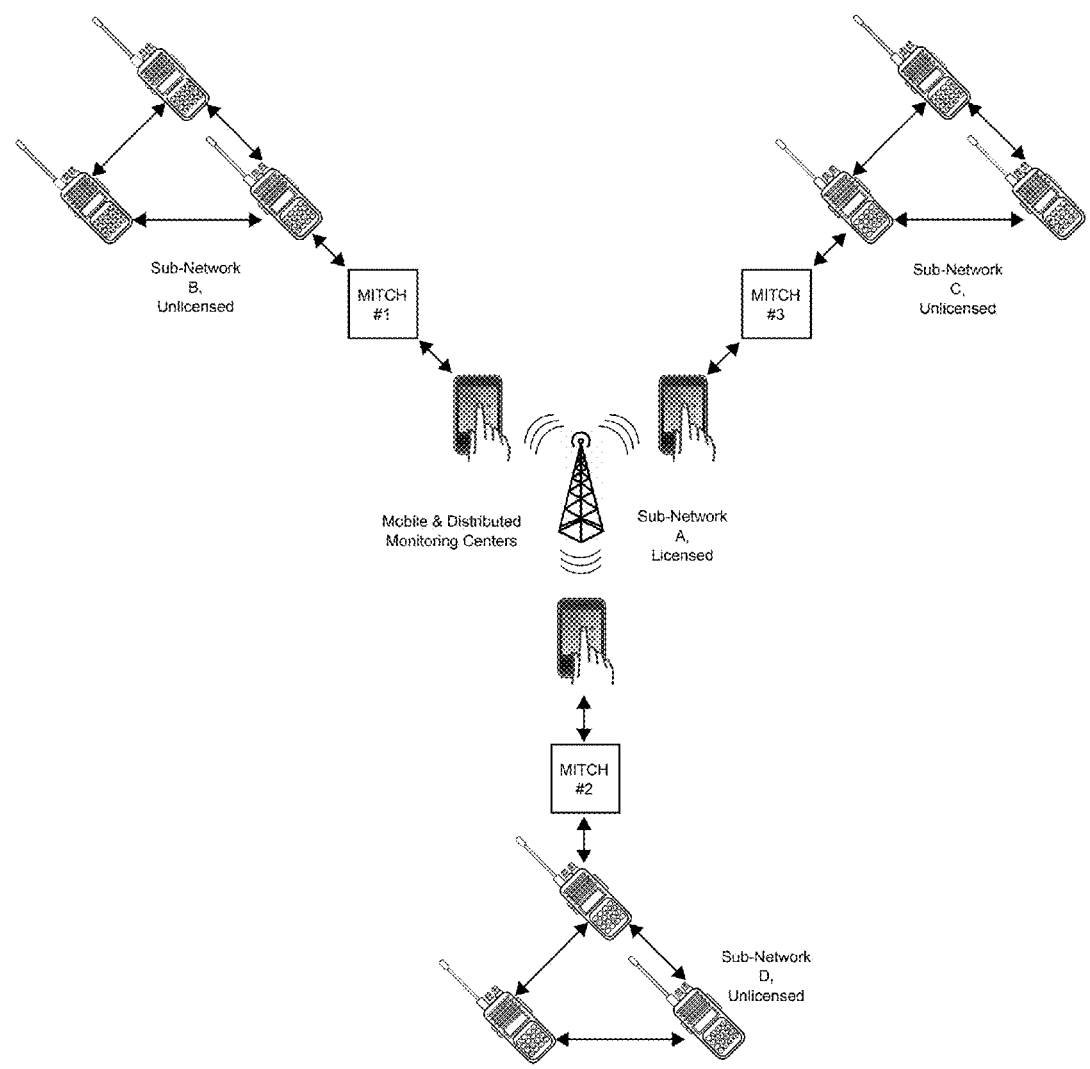
FIGS. 6A-6B depict various deployments of a mobile intelligent tracking and communication hub within a mobile ad-hoc network.
Figure 6B:
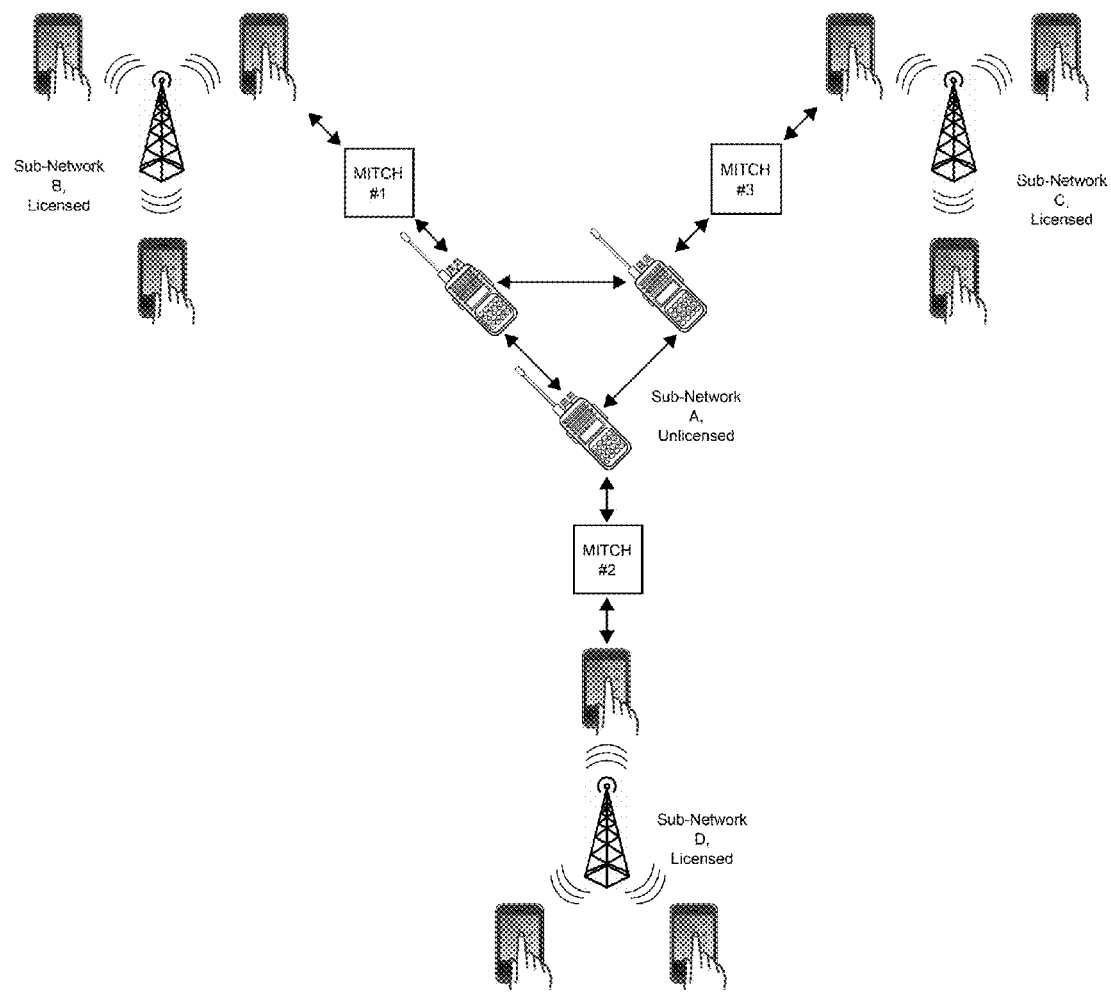
Figure 8:
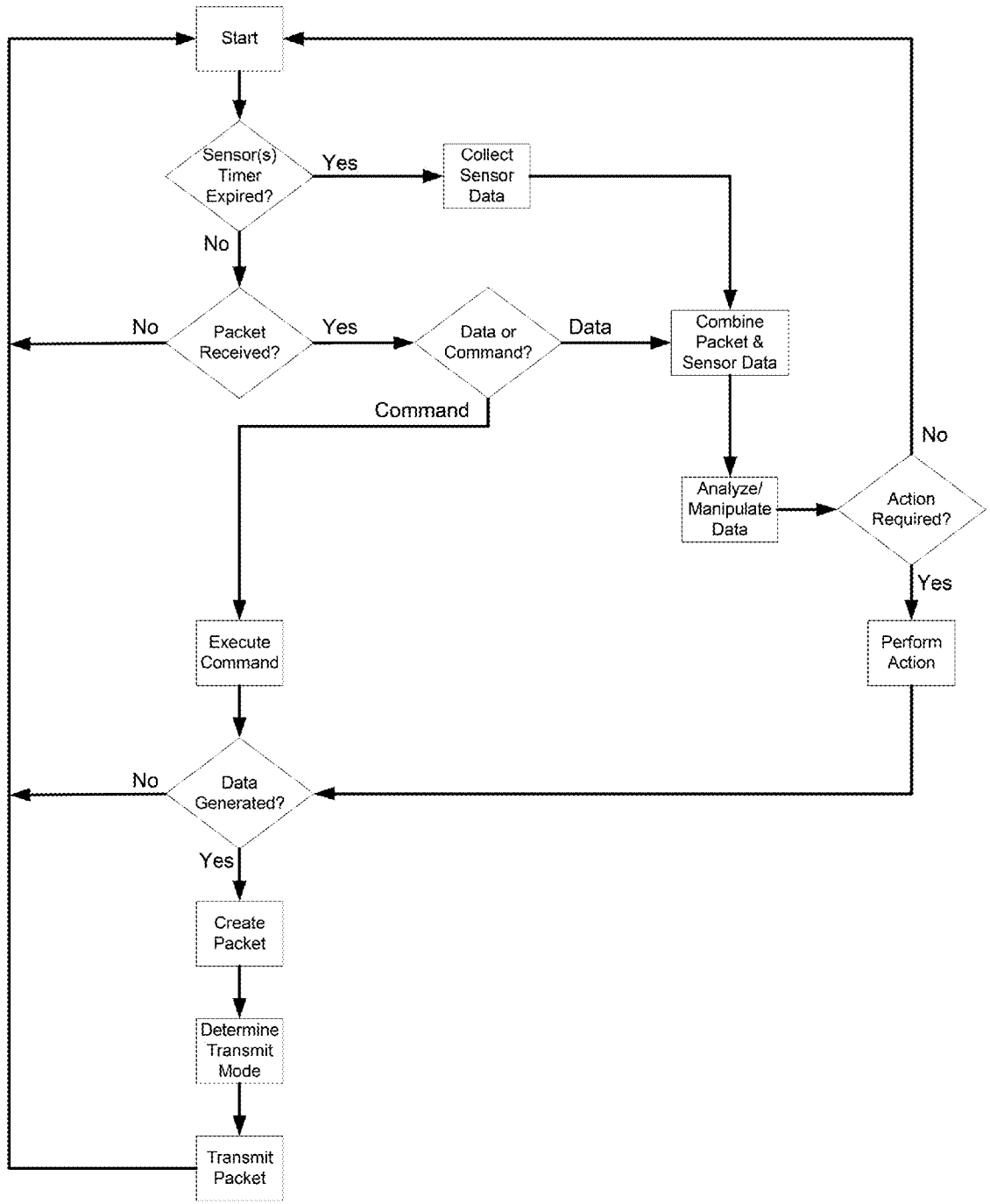
FIG. 8 depicts a flowchart for the operation of a mobile intelligent tracking and communication hub in accordance with an embodiment of the present invention.

FIG. 4 depicts an OSI model showing the typical operation of the MITCH device. In particular, FIG. 4 depicts receiving data in a first protocol, manipulating the data in response to sensor information, and transmitting the manipulated data in a second protocol. FIG. 8 depicts a flowchart for the operation of an exemplary MITCH device.

Although the MITCH device has been described with respect to receiving a data packet from one device and transmitting the data packet to another device, it is within the scope of the present invention for the MITCH device to receive data packets from a plurality of devices and/or transmit data packets to a plurality of devices.

Figure 7B:
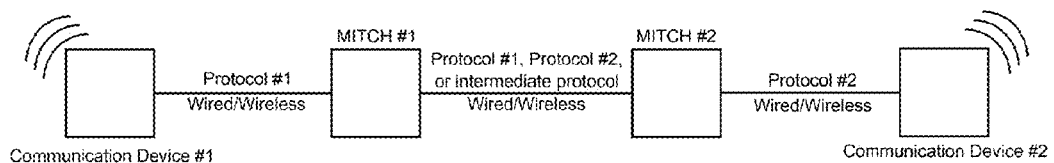

In another aspect, the present invention embraces a network of more than one MITCH device. In this regard, FIG. 7B depicts a network of two MITCH devices forming a bridge between a first communication device and a second communication device. As depicted in FIG. 7B, the first MITCH device receives a data packet in a first protocol from the first communication device. Next, the first MITCH device transmits the data packet to the second MITCH device. The first MITCH device may transmit the data packet in the first protocol. Alternatively, the first MITCH device may translate the data packet to a second protocol or to a common intermediate protocol before transmitting the data packet to the second MITCH device. The data packet may be manipulated by the first MITCH device and/or the second MITCH device (e.g., in response to situational status information from the first MITCH device and/or the second MITCH device). The second MITCH device may translate the data packet to the second protocol, if this step has not already been performed by the first MITCH device. Finally, the second MITCH device transmits the data packet to the second communication device.

FIGS. 3, 5, 6A, 6B, and 9 depict a MITCH device in accordance with the present invention being deployed within a mobile ad-hoc network. A mobile ad-hoc network is described in commonly assigned U.S. Patent Application Publication No. 2009/0238087; U.S. Patent Application Ser. No. 60/984,456; U.S. Patent Application Ser. No. 60/984,462; U.S. Patent Application Ser. No. 60/984,486; and U.S. Patent Application Ser. No. 60/984,494, each of which is hereby incorporated by reference in its entirety. A MITCH device in accordance with the present invention may be employed as a gateway node, a core node, or a fringe node within a mobile ad-hoc network.

Figure 9:
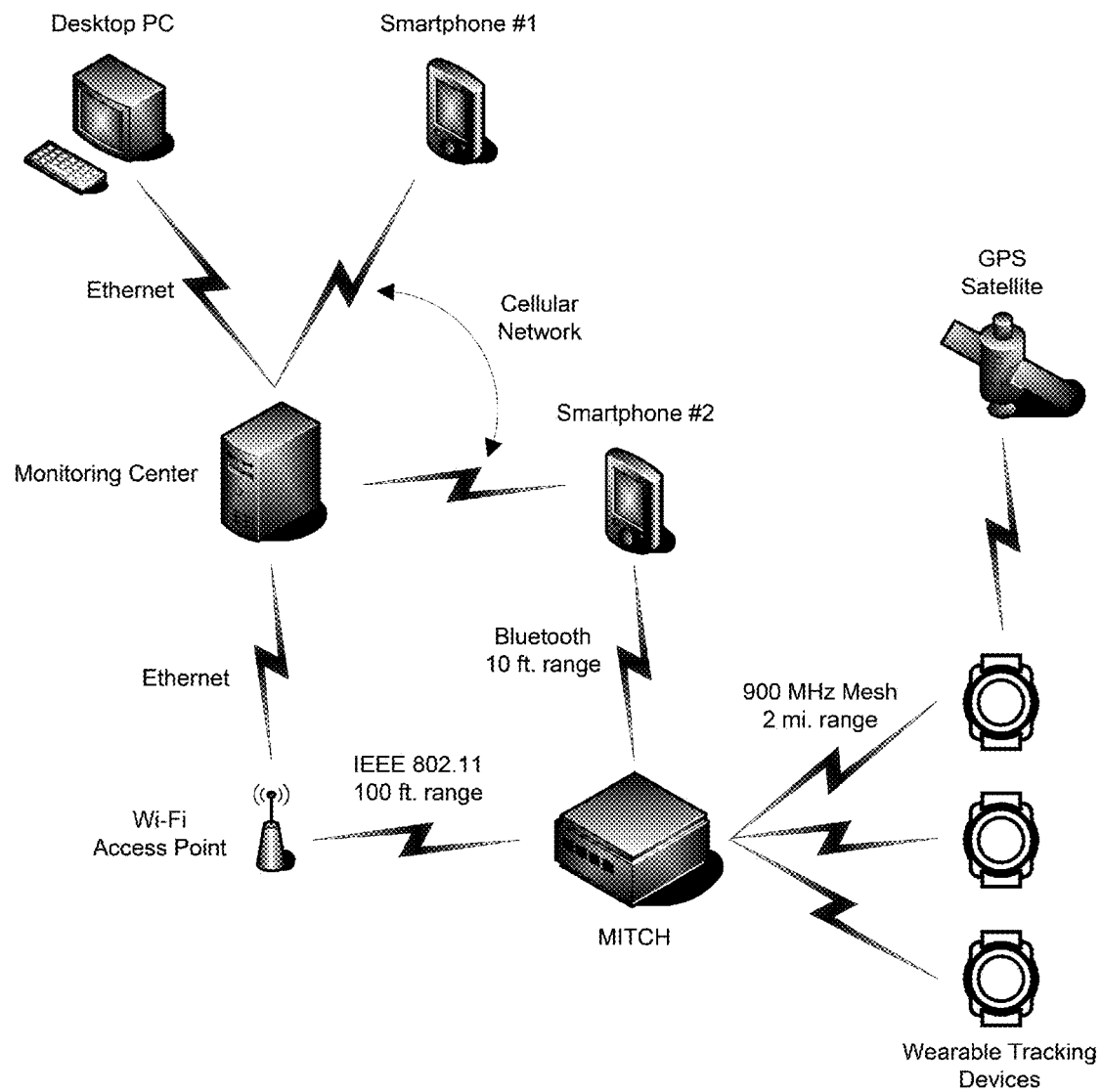
FIG. 9 depicts a mobile intelligent tracking and communication hub being employed within a mobile ad-hoc network in accordance with yet another embodiment of the present invention.

FIG. 9 is an exemplary application of a MITCH device in a personal tracking system that employs a mobile ad-hoc network. Here the MITCH device is used to translate signals from short range 2.4 GHz Wi-Fi and Bluetooth communication protocols to a longer range 900 MHz mesh communication protocol, while utilizing GPS sensors (as well as other sensors) on wearable tracking devices to regulate network traffic.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A mobile communication hub communicating with at least first and second devices, comprising:
   firmware configured to implement the hub in a hub environment;
   a communication module stored in the firmware, the communication module being configured to connect the first and second devices to each other by receiving and transmitting data in both a first protocol and a second protocol;
   a sensor module stored in the firmware, receiving situational status information from at least one sensor outside the firmware, and gathering information about another environment other than the hub environment, wherein at least one of the first and second devices is located in said another environment;
   a processor communicatively coupled to the communication module and the sensor module, said processor being configured for:
   receiving with the communication module a data packet in the first protocol from the first device;
   manipulating the data packet in response to situational status information received by the sensor module;
   translating the data packet from the first protocol to the second protocol; and
   transmitting the data packet with the communication module to the second device, the second device being configured to receive data in the second protocol.

2. The mobile communication hub according to claim 1, wherein manipulating the data packet comprises (i) adding data to the data packet, (ii) deleting data from the data packet, and/or (iii) formatting data in the data packet.

3. The mobile communication hub according to claim 1, wherein translating the data packet from the first protocol to the second protocol comprises translating the data packet from the first protocol to an intermediate protocol and thereafter translating the data packet from the intermediate protocol to the second protocol.

4. The mobile communication hub according to claim 3, wherein manipulating the data packet comprises manipulating the data packet when the data packet is in the intermediate protocol.

5. The mobile communication hub according to claim 1, wherein manipulating the data packet comprises manipulating the data packet when the data packet is in the first protocol.

6. The mobile communication hub according to claim 1, wherein manipulating the data packet comprises manipulating the data packet when the data packet is in the second protocol.

7. The mobile communication hub according to claim 1, wherein the sensor module receives the situational status information by communicating with the sensor being selected from the group consisting of a location sensor, an acceleration sensor, an audio sensor, a visual sensor, a temperature sensor, a pressure sensor, a chemical sensor, a radiation sensor, and a biological sensor.

8. A mobile communication hub, comprising:
   firmware configured to implement the hub;
   a communication module stored in the firmware, the communication module being configured to connect first and second devices to each other by receiving and transmitting data in both a first protocol and a second protocol, the communication module being further configured to communicate with a communication network;
   a processor communicatively coupled to the communication module, said processor being configured for:
   receiving with the communication module a data packet in the first protocol from the first device;
   receiving with the communication module a command from the communication network, the command originating from a monitoring center outside the firmware and communicating with the hub and the first and second devices via a backhaul;
   manipulating the data packet in response to receiving the command and situational status information from outside the firmware across the communication network, said situational status information comprising measured environmental data above a threshold;
   translating the data packet from the first protocol to the second protocol; and transmitting the data packet with the communication module to the second device, the second device being configured to receive data in the second protocol.

9. The mobile communication hub according to claim 8, wherein receiving with the communication module the command from the communication network comprises receiving the command from a mobile device within the communication network.

10. The mobile communication hub according to claim 8, wherein manipulating the data packet comprises (i) adding data to the data packet, (ii) deleting data from the data packet, and/or (iii) formatting data in the data packet.

11. The mobile communication hub according to claim 8, wherein translating the data packet from the first protocol to the second protocol comprises translating the data packet from the first protocol to an intermediate protocol and thereafter translating the data packet from the intermediate protocol to the second protocol.

12. The mobile communication hub according to claim 11, wherein manipulating the data packet comprises manipulating the data packet when the data packet is in the intermediate protocol.

13. A mobile communication hub communicating with at least first and second devices, comprising:
 firmware configured to implement the hub;
 a communication module, the communication module being configured to receive and transmit data in both a first protocol and a second protocol, the communication module being configured to communicate with a communication network;
 a processor communicatively coupled to the communication module, said processor being configured for:
 receiving with the communication module a data packet in the first protocol from a first device located outside the firmware of the hub;
 receiving with the communication module situational status information from the communication network, wherein said situational status information comprises measured environmental data from at least one sensor outside the firmware, connected to the communication network and gathering information about an environment in which at least one of the devices is located;
 manipulating the data packet in response to receiving situational status information comprising said measured environmental data above a threshold from one of the devices in the communication network;
 translating the data packet from the first protocol to the second protocol; and
 transmitting the data packet with the communication module to a second device, the second device being configured to receive data in the second protocol.

14. The mobile communication hub according to claim 13, wherein receiving with the communication module the situational status information from the communication network comprises receiving with the communication module the situational status information from a mobile device in the communication network.

15. The mobile communication hub according to claim 13, herein receiving with the communication module the situational status information from the communication network comprises receiving with the communication module the situational status information from a monitoring center in the communication network.

16. The mobile communication hub according to claim 13, wherein manipulating the data packet comprises (i) adding data to the data packet, (ii) deleting data from the data packet, and/or (iii) formatting data in the data packet.

17. The mobile communication hub according to claim 13, wherein translating the data packet from the first protocol to the second protocol comprises translating the data packet from the first protocol to an intermediate protocol and thereafter translating the data packet from the intermediate protocol to the second protocol.

18. The mobile communication hub according to claim 17, wherein manipulating the data packet comprises manipulating the data packet when the data packet is in the intermediate protocol.

\* \* \* \* \*